UNITED STATES PATENT OFFICE.

CHAUNCEY H. ERWIN, OF ALLIANCE, OHIO.

COMPOSITION FOR FILLING CAVITIES IN TREES.

1,160,701.     Specification of Letters Patent.    Patented Nov. 16, 1915.

No Drawing.     Application filed February 9, 1915. Serial No. 6,976.

*To all whom it may concern:*

Be it known that I, CHAUNCEY H. ERWIN, a citizen of the United States, residing at Alliance, in the county of Stark and State of Ohio, have invented a new and useful Composition for Filling Cavities in Trees.

My composition consists of the following ingredients, preferably combined in the following named proportions:

| | |
|---|---|
| Ground asbestos | 40%, |
| Refined coal tar | 50%, |
| Pine oil | 8%, |
| Pigment to approximately produce the color of the tree or bark designed to be treated | 2%. |

These ingredients are to be thoroughly mingled by agitation, kneading, or other process.

In using the above named composition for the treatment and filling of cavities in trees or plants, the decayed portions are removed by suitable tools, thereby presenting a clean and undecayed surface. The above named composition while in a plastic or semi-plastic state is placed in the cavity and allowed to become set.

It will be understood that by using the above named ingredients the body or filler will not become rigid to such an extent as to form cavities or spaces for the admission of moisture. Owing to the fact that the composition remains in a comparatively yielding or pliable condition there will be no appreciative separation as between the filler and the wall or walls of the cavity or cavities. Owing to the fibrous nature of the filler the fibers of the tree or plant are permitted, to a certain extent, to interlace with the fibrous material of the filler, thereby aiding in the healing process.

In the treatment of cuts or bruises the composition is applied to the injured part in such a manner as to seal such injured part, the manner of applying being governed by the nature of the injury of the tree or plant, as for instance when a limb or branch of a tree is cut, the exposed cut or the end of the limb of the tree is sealed by placing a coating upon the cut surface.

I claim:

The herein described composition of matter for the purpose specified, consisting of ground asbestos, refined coal tar, pine oil and pigment in about the proportions named.

In testimony that I claim the above, I have hereunto subscribed my name in the presence of two witnesses.

CHAUNCEY H. ERWIN.

Witnesses:
   H. C. KOEHLER,
   D. H. HOOBLER.